Patented Dec. 13, 1949

2,491,057

UNITED STATES PATENT OFFICE 2,491,057

CATALYTIC OXIDATION OF ETHYLENE TO ETHYLENE OXIDE

John A. Nevison and Robert M. Lincoln, Media, Pa., assignors to The Atlantic Refining Company, Philadelphia, Pa., a corporation of Pennsylvania No Drawing. Application June 21, 1947, Serial No. 756,332

4 Claims. (Cl. 260—348.5)

This invention relates to the production of olefin oxides, and more particularly to the production of ethylene oxide.

The process of oxidizing olefins directly to olefin oxides with molecular oxygen, wherein a mixture of the olefins and an oxygen-containing gas such as air is passed over a fixed bed contact catalyst, has long been known. Various catalysts have been used, such as finely divided silver alone, or promoted with small amounts of other finely divided metals such as gold, copper, or iron, or with peroxides, oxides, or hydroxides of barium, strontium, or lithium, at temperatures within the range of 250° C. to 300° C. These catalysts have been employed both alone and supported on various inert carriers. Since this reaction is exothermic, it has been found that a major difficulty attending the use of these various catalysts is the formation of "hot spots," or points of local overheating in the catalyst bed, particularly near the point at which the reactants are introduced into the catalyst bed. This reaction requires rather careful temperature control to prevent the occurrence of temperatures high enough to cause complete combustion of the olefin, and to prevent the formation of the above mentioned "hot-spots" which result in a decided lowering of olefin oxide yield, and in some cases inactivation of the catalyst.

The present invention obviates these difficulties by employing heat absorbing and conducting masses imbedded in and distributed at random throughout the active catalyst bed. The preferred form of these masses is short lengths of wire, rods, or irregular lumps. This heat absorbing material prevents the formation of points of local overheating by the rapid absorption and conduction of the heat of reaction from a potential source of a large amount of heat to a point of lower heat content, and thus quickly and evenly distributes the heat throughout the entire catalyst mass. In addition to distributing the heat evenly throughout the catalyst mass, the absorbing material also conducts heat to the wall of the vessel by reason of its contact therewith, whereby the excess heat may be abstracted by means of a cooling medium circulated through a jacket surrounding the walls of the reaction vessel.

It has been found that the materials which possess to the highest degree the two requisites of a heat absorptive material for this purpose, i. e., high heat conductivity and freedom from deleterious catalytic activity, are massive metallic silver and copper. These metals when employed in the manner described, greatly reduce or entirely eliminate the formation of "hot spots" in the catalyst bed.

The oxidation reaction is applied most advantageously to low molecular weight olefins, such as ethylene and propylene. These olefins are reacted with a gas containing free oxygen, for example air or mixtures of oxygen with nitrogen, carbon dioxide, steam, or similar diluents. In the case of the reaction of ethylene with air, the ratio ranges from 8 to 20 volumes of air per 1 volume of ethylene, however, the preferred range is from 10 to 13 volumes of air per volume of ethylene.

In carrying out the reaction, the catalyst bed should be maintained at a temperature within the range of 250° C. to 300° C. to obtain the highest conversion of ethylene to ethylene oxide, although substantial conversions may be obtained at 350° C. With the catalysts heretofore used, it was necessary to employ low flow rates in order to control the temperature within the usual 250° C. to 300° C. range, and thus obtain the maximum conversion. In spite of this precaution, uncontrollable local overheating was very likely to occur, and since the flow rates were low, the yields of ethylene oxide per unit of time were necessarily low. However, in accordance with the present invention, it not only is possible to employ higher flow rates (with consequent increase in yield) at the temperatures of maximum conversion, but it has also been found feasible to greatly increase the flow rates by raising the reaction temperature to as high as 350° C. without serious drop in the percent conversion of ethylene to ethylene oxide.

The preferred composition of the active portion of the catalyst comprises an intimate mixture of from 5 to 15 parts by weight of barium peroxide and 100 parts by weight of finely divided silver or silver oxide. Whenever silver oxide is employed as a part of the catalyst it is reduced to silver by the ethylene prior to the start of the actual oxidation reaction, therefore, silver and silver oxide are considered equivalents. From 500 to 700 parts by weight of copper or silver metal are distributed at random throughout this mixture. The copper or silver metal may be in the form of wire ranging, for example, from ¼ to ½ inch in length and 15 to 20 B. & S. gauge, or in the form of rods or irregular lumps, the only limitation being that the pieces should be small enough to allow uniform distribution throughout the catalyst mass. If desired, additional modifications of the catalyst composition may be made, for example, the catalyst may be supported upon or commingled with carriers such as alundum, or tabular alumina. Promoters other than barium peroxide may be used, including peroxides, oxides, or hydroxides of barium, strontium, or lithium, or with small amounts of finely divided metals such as gold, copper, or iron.

The reaction chambers employed are preferably elongated tubes having an inside diameter not greater than 2 inches and preferably between ¾ and 1½ inches. The amount of catalyst should be sufficient to form a bed having a depth between 12 and 18 inches. The reaction chambers are surrounded by a jacket through which a heat transfer medium is circulated to control the reaction temperature.

The following table summarizes the results of a number of tests wherein ethylene was oxidized to ethylene oxide in a reactor having a 1 inch inside diameter and a catalyst bed depth of 12 inches. The catalyst temperature was raised to 250° C. by circulating a heating medium through the jacket surrounding the reaction chamber, then a mixture of about 10 volumes of air and one volume of ethylene was passed through the catalyst bed and the temperature allowed to increase to the final figures noted in the table, at which temperatures the reaction was carried on for sufficient length of time to establish equilibrium conditions.

| Catalyst | Ethylene Flow Rate | Conversion | Yield of Ethylene Oxide, g./hr. | Temperature |
|---|---|---|---|---|
| 90 pts. by wt. Tabular Alumina, 10 pts. by wt. Silver Oxide | ml./min. 74 | Per cent 32 | 2.9 | °C. 300 |
| 55 pts. by wt. Copper Wire,[1] 10 pts. by wt. Silver Oxide, 1 pt. by wt. Barium Peroxide | 84 | 34 | 3.6 | 310 |
| Do | 189 | 33 | 7.1 | 330 |
| Do | 330 | 28 | 11.0 | 350 |
| Do | 348 | 25 | 10.4 | 373 |

[1] ¼" lengths of 18 B. & S. gauge.

The ethylene oxide produced employing the catalyst of this invention can be recovered by any of the conventional methods such as scrubbing with water or ethylene glycol solutions, charcoal adsorption or similar methods. Unconverted ethylene may be recovered from the reaction products and recycled for further conversion into ethylene oxide.

We claim:
1. In a process involving exothermic reaction between ethylene and air to produce ethylene oxide, in the presence of a contact catalyst comprising 5 to 15 parts by weight of barium peroxide and 100 parts by weight of finely divided silver, the method of controlling the rise of temperature during the exothermic reaction which comprises maintaining 500 to 700 parts by weight of a heat absorptive material from the group consisting of massive metallic copper and silver in admixture with the contact catalyst to absorb the exothermic heat of reaction without permitting rise in temperature to levels sufficiently high to cause complete oxidation of the ethylene, and abstracting the heat from said absorptive material.

2. In a process involving exothermic reaction between ethylene and air to produce ethylene oxide, at a temperature between 250° C. and 350° C. in the presence of a contact catalyst comprising 5 to 15 parts by weight of barium peroxide and 100 parts by weight of finely divided silver, the method of controlling the rise of temperature during the exothermic reaction which comprises maintaining 500 to 700 parts by weight of a heat absorptive material from the group consisting of massive metallic copper and silver in admixture with the contact catalyst to absorb the exothermic heat of reaction without permitting the temperature to rise above 350° C.

3. A process for the production of ethylene oxide which comprises passing a mixture of ethylene and air at a temperature between 250° C. and 350° C. over a contact catalyst comprising 5 to 15 parts by weight of barium peroxide, 100 parts by weight of finely divided silver, and 500 to 700 parts by weight of a heat absorptive material from the group consisting of massive metallic copper and silver.

4. In a process involving exothermic reaction between ethylene and air to produce ethylene oxide, in the presence of a contact catalyst comprising 100 parts by weight of finely divided silver, the method of controlling the rise of temperature during the exothermic reaction which comprises maintaining 500 to 700 parts by weight of a heat absorptive material from the group consisting of massive metallic copper and silver in admixture with the contact catalyst to absorb the exothermic heat of reaction without permitting rise in temperature to levels sufficiently high to cause complete oxidation of the ethylene, and abstracting the heat from said absorptive material.

JOHN A. NEVISON.
ROBERT M. LINCOLN.

REFERENCES CITED

The following references are of record in the file of this patent:

UNITED STATES PATENTS

| Number | Name | Date |
|---|---|---|
| 1,043,580 | Eldred | Nov. 5, 1912 |
| 1,998,878 | Lefort | Apr. 23, 1935 |
| 2,142,948 | Law | Jan. 3, 1939 |
| 2,238,474 | McNamee et al. | Apr. 15, 1941 |
| 2,423,835 | Houdry | July 15, 1947 |
| 2,424,083 | Finch et al. | July 15, 1947 |
| 2,424,086 | Bergsteinsson et al. | July 15, 1947 |
| 2,426,761 | Cambron et al. | Sept. 2, 1947 |
| 2,430,443 | Becker | Nov. 11, 1947 |

FOREIGN PATENTS

| Number | Country | Date |
|---|---|---|
| 466,416 | Great Britain | May 24, 1937 |